(12) United States Patent
    Radulescu-Banu et al.

(10) Patent No.: US 12,477,042 B1
(45) Date of Patent: Nov. 18, 2025

(54) STATE TRANSITIONS FOR REDUNDANCY GROUPS

(71) Applicant: Juniper Networks, Inc., Sunnyvale, CA (US)

(72) Inventors: Cristina Radulescu-Banu, Lexington, MA (US); John Gibbons, Ashland, MA (US); John E. Ziegler, Westborough, MA (US); Andrzej W. Szyszko, Holden, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 20 days.

(21) Appl. No.: 18/398,272

(22) Filed: Dec. 28, 2023

(51) Int. Cl.
    *H04L 67/148* (2022.01)
    *H04L 45/302* (2022.01)
(52) U.S. Cl.
    CPC .......... *H04L 67/148* (2013.01); *H04L 45/308* (2013.01)
(58) Field of Classification Search
    CPC ..................... H04L 67/148; H04L 45/308
    See application file for complete search history.

(56) References Cited

U.S. PATENT DOCUMENTS

| | | | | |
|---|---|---|---|---|
| 2004/0095881 | A1* | 5/2004 | Borella | H04L 63/08 370/219 |
| 2007/0253328 | A1* | 11/2007 | Harper | H04L 45/00 370/219 |
| 2010/0220656 | A1* | 9/2010 | Ramankutty | H04W 24/04 370/328 |
| 2012/0236730 | A1* | 9/2012 | Zhou | H04L 45/68 370/244 |
| 2016/0323179 | A1* | 11/2016 | Wang | H04L 67/566 |
| 2022/0337512 | A1* | 10/2022 | Hu | H04L 45/245 |
| 2023/0231797 | A1* | 7/2023 | Mohan | H04L 45/28 709/239 |
| 2023/0370422 | A1* | 11/2023 | Singh | H04L 63/0263 |

* cited by examiner

*Primary Examiner* — Benjamin M Thieu
(74) *Attorney, Agent, or Firm* — Harrity & Harrity, LLP (57) ABSTRACT

In some implementations, a network device may receive an indication of a switchover for a subscriber group that contains subsets of subscriber sessions. The network device may transition each subset of the subscriber sessions to a state associated with traffic forwarding. The network device may selectively transition each subset of the subscriber sessions from the state associated with the traffic forwarding to a state associated with traffic services.

20 Claims, 6 Drawing Sheets

STATE TRANSITIONS FOR REDUNDANCY GROUPS

BACKGROUND

A subscriber (e.g., a user) can obtain network access using a subscriber device. A subscriber device can be a remote terminal, a residential gateway (RG), customer premises equipment (CPE), a user equipment (UE), and/or the like. One or more subscribers, that share similar or the same network traffic characteristics, service level agreements, or the like, can be assigned to a subscriber group (SGRP) for traffic routing purposes.

SUMMARY

Some implementations described herein relate to a method. The method may include receiving, by a network device, an indication of a switchover for a subscriber group that contains subsets of subscriber sessions. The method may include transitioning, by the network device, each subset of the subscriber sessions to a state associated with traffic forwarding. The method may include selectively transitioning, by the network device, each subset of the subscriber sessions from the state associated with the traffic forwarding to a state associated with traffic services.

Some implementations described herein relate to a network device. The network device may include one or more memories and one or more processors. The one or more processors may be to receive an indication of a switchover for a subscriber group that contains redundancy groups of subscriber sessions. The one or more processors may be to transition each redundancy group to a state associated with traffic forwarding. The one or more processors may be to selectively transition each redundancy group from the state associated with the traffic forwarding to a state associated with traffic services.

Some implementations described herein relate to a non-transitory computer-readable medium that stores a set of instructions. The set of instructions, when executed by one or more processors of an oversubscribed network device, may cause the oversubscribed network device to receive an indication of a switchover for a subscriber group that contains subsets of subscriber sessions. The set of instructions, when executed by one or more processors of the oversubscribed network device, may cause the oversubscribed network device to transition each subset of the subscriber sessions to a state associated with traffic forwarding. The set of instructions, when executed by one or more processors of the oversubscribed network device, may cause the oversubscribed network device to selectively transition each subset of the subscriber sessions from the state associated with the traffic forwarding to a state associated with traffic services.

DETAILED DESCRIPTION

The following detailed description of example implementations refers to the accompanying drawings. The same reference numbers in different drawings may identify the same or similar elements.

Some network devices may enable subscriber devices to access a network. To accommodate growths in a quantity of subscribers, a quantity and types of services being provided by the network devices, and an amount of traffic being processed by the network devices, a network operator may deploy control and user plane separation (CUPS). For example, software to perform control plane functions may be distributed for execution by a control plane network device. One or more user plane network devices may remain in a forwarding path between subscriber devices and a network to process traffic (e.g., packet flows) between subscriber devices and the network.

The user plane network devices may be deployed in a resiliency model that supports redundancy. The resiliency model may involve multiple user plane network devices configured to support one or more SGRPs (e.g., resiliency SGRPs). For example, the resiliency model may involve one or more active user plane network devices and/or one or more backup user plane network devices. An active user plane network device serves one or more SGRPs, and a backup user plane network device serves as a backup for the one or more SGRPs. For example, in the event of a failure of an active user plane network device, the SGRP(s) served by the active user plane network device may switch over to the backup user plane network device.

Examples of resiliency models may include 1:1 resiliency models, N:1 resiliency models, and M:N resiliency models. A 1:1 resiliency model may provide one-to-one redundancy. For example, the 1:1 resiliency model involve two active user plane network devices, or one active user plane network device and one backup user plane network device. An N:1 resiliency model may provide N-to-one redundancy. For example, the N:1 resiliency model may involve multiple (e.g., N) active user plane network devices and one backup user plane network device. An M:N resiliency model may provide M-to-N redundancy. For example, the M:N resiliency model may involve M active user plane network devices and N backup user plane network device, where M may be greater than N. Additionally, or alternatively, variations of these resiliency models may be implemented.

A user plane network device may operate in a specific state that depends on the resiliency model and/or implementation of the user plane network device. For example, a user plane network device may operate in an active state, a hot standby state, or a warm standby state. A user plane network device operating in an active state may provide traffic services (e.g., firewall filters, class-of-service, or the like) and traffic forwarding for one or more subscriber sessions of an SGRP. For example, in a 1:1 resiliency model, one or both active user plane network devices may maintain fully-restored subscriber sessions. For example, the active user plane network device(s) may maintain subscriber session states that are fully installed on hardware of the active user plane network device(s). A user plane network device may use the subscriber session states installed on hardware of the user plane network device to provide traffic services for subscriber sessions. Thus, the active user plane network device(s) may provide traffic forwarding with full traffic services.

User plane network devices serving as backup user plane network devices may operate in the hot standby state or in the warm standby state. A backup user plane network device operating in a hot standby state may be programmed with all subscriber session states. For example, the subscriber session states may be fully installed on hardware of the backup user plane device. As a result, the backup user plane network device may be configured to provide traffic services before beginning to forward any traffic. Upon switchover (e.g., SGRP switchover, failover, or the like), a backup user plane network device operating in a hot standby state may preserve the full subscriber session states and quickly and seamlessly provide traffic forwarding with the traffic services (e.g., full traffic services) for the subscriber sessions.

The warm standby state may involve partial state implementation on the backup user plane network device. For example, a backup user plane network device operating in a warm standby state may be configured to use minimum resources for all sessions to allow for basic, best-effort forwarding. The backup user plane network device may maintain the full subscriber session state in memory (e.g., a line card kernel) of the backup user plane network device. Thus, before switchover, the backup user plane network device may not be configured to provide traffic services. Upon switchover, the backup user plane network device may install the full subscriber session state in hardware of the backup user plane network device, which may restore the full subscriber session state on-the-fly.

Whether a backup user plane network device operates in hot standby state or warm standby state may depend on whether the backup user plane network device is oversubscribed. A backup user plane network device may be oversubscribed in that the backup user plane network device may be configured with more subscriber sessions of the SGRPs than the backup user plane network device can simultaneously support. For example, the backup user plane network device may not have sufficient resources to fully support all traffic services for all subscriber sessions served by the active user plane network devices simultaneously (e.g., in an N:1 or M:N resiliency model). A backup user plane network device that is not oversubscribed (e.g., does not support oversubscription) may not be resource-constrained and, thus, may operate in a hot standby state. A backup user plane network device that is oversubscribed (e.g., supports oversubscription) may be resource-constrained and, thus, may operate in a warm standby state.

A backup user plane network device (e.g., an oversubscribed backup user plane network device) that is operating in a warm standby state may support RGRPs. RGRPs may be subsets of subscriber sessions contained in an SGRP. For example, a large SGRP that contains a quantity of subscribers may be broken down into smaller "child" RGRPs. Before switchover, the SGRP and each of the RGRPs on the backup user plane network device may be in the warm standby state. Upon switchover, the backup user plane network device may transition the SGRP to the active state and then transition each RGRP, one-by-one, to the active state.

The warm standby state may involve high latencies. For example, restoring full subscriber session states to hardware of a backup user plane network device and/or determining hardware resource utilization from a resource monitoring perspective may cause delays in resumption of traffic forwarding upon switchover to the backup user plane network device. For example, because the backup user plane network device transitions each RGRP one-by-one to the active state, the delay in resuming forwarding of network traffic may increase with each subsequent RGRP.

Delays due to restoring subscriber sessions to full state forwarding may increase with scale. For example, for a large number of subscribers in an SGRP in oversubscribed mode (e.g., warm standby state), the transition from the standby state to the active state can take a long time. For example, if the SGRP contains 96,000 subscriber sessions, the time involved in transitioning each of the 96,000 subscriber sessions from traffic not being forwarded (e.g., in the warm standby state) to the traffic being forwarded (e.g., in the active state) may be excessive.

Furthermore, the backup user plane network device may have insufficient resources to support the full state for all subscriber sessions. For example, the backup user plane network device may have insufficient resources to support the full state for all subscriber sessions in cases where the backup user plane network device is already an active user plane network device for a different SGRP due to a prior switchover.

Some implementations described herein enable a backup user plane network device to quickly restore subscriber sessions upon switchover to the backup user plane network device. In some examples, upon switchover, the backup user plane network device may restore basic traffic flow immediately (or near-immediately). For example, the backup user plane network device may restore a minimum best-effort forwarding state for all subscriber sessions. The backup user plane network device may restore basic traffic flow by transitioning the state of the subscriber sessions to an oversubscribed state (e.g., a "warm forwarding state") in which the full forwarding state has not yet been restored. For example, in the warm forwarding state, the backup user plane network device may provide traffic forwarding for traffic flows without traffic services (e.g., traffic forwarding with traffic services, such as firewall filters, class-of-service, or the like).

In some examples, after restoring the minimum best-effort forwarding state for all subscriber sessions, the backup user plane network device may restore the full forwarding state (e.g., traffic forwarding with traffic services, such as firewall filters, class-of-service, or the like) for all subscriber sessions up to the resource limits of the backup user plane network device. The backup user plane network device may restore the full forwarding state by transitioning the state of the subscriber sessions to an active state. For example, the backup user plane network device may iteratively switch RGRPs from the warm forwarding state to the active state. Thus, the warm forwarding state may reflect an intermediate subscriber state during restoration upon switchover (e.g., the subscriber sessions may assume the warm forwarding state until full services are restored via the RGRPs).

As a result, fast and deterministic traffic failover may be provided for oversubscribed resiliency. For example, restoring the basic traffic flow may reduce the overall transition time for backup user plane network devices to restore the subscriber sessions. For example, transitioning to the warm forwarding state may reduce traffic blackholing during switchover. Furthermore, restoring the full forwarding state for all subscriber sessions up to the resource limits of the backup user plane network device may prevent the backup user plane network device from exceeding hardware resource limits. For example, switching from the warm forwarding state to the active state on a per-RGRP basis may enable fast failover for network traffic.

Figure 1:
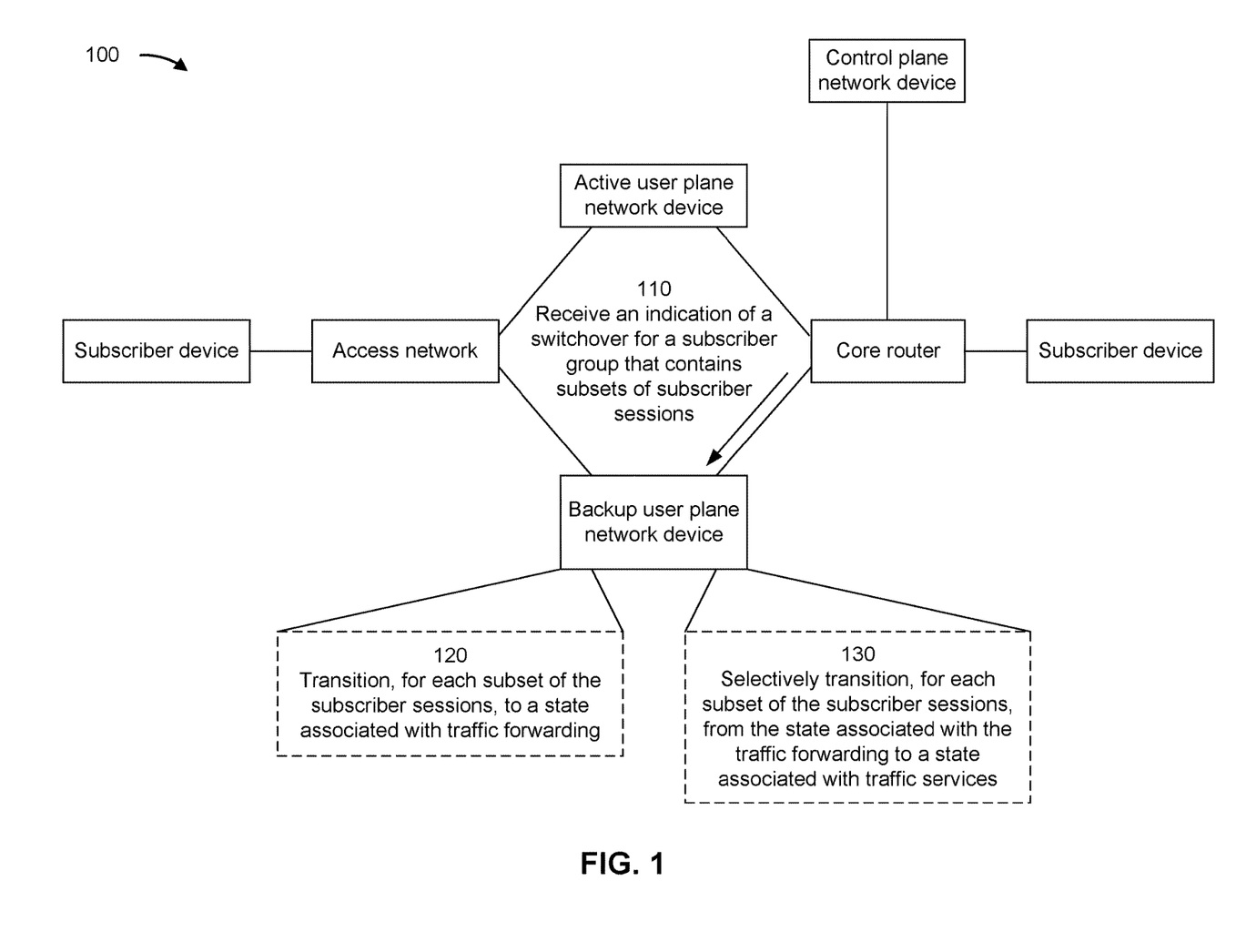
FIG. 1 is a diagram of an example implementation associated with state transitions for redundancy groups (RGRPs).

FIG. 1 is a diagram of an example implementation 100 associated with state transitions for RGRPs. As shown in FIG. 1, example implementation 100 includes a subscriber device, an access network (e.g., a layer 2 (L2) access network or the like), an active user plane network device, a backup user plane network device, a core router, another subscriber device, and a control plane network device. These devices are described in more detail below in connection with FIGS. 3-5.

The active user plane network device may serve an SGRP, and the backup user plane network device may serve as a backup for multiple active user plane network devices including the active user plane network device. In some examples, the backup user plane network device may be oversubscribed.

The SGRP may contain RGRPs, which may be subsets (e.g., logical groups, blocks, increments, chunks, or the like) of subscriber sessions of the SGRP. In some examples, the control plane network device may provision SGRP and/or the RGRPs on the backup user plane network device. The backup user plane network device may set the SGRP, and the RGRPs, in a warm standby state.

In some aspects, the control plane network device may transmit, and the backup user plane network device may receive, one or more indications of respective priorities associated with the RGRPs. Thus, the control plane network device may identify and control the respective priorities. The respective priorities may be associated with the RGRPs in that network traffic belonging to the RGRPs may be handled based on the respective priorities. For example, network traffic belonging to an RGRP having a higher priority than another RGRP may be prioritized over network traffic belonging to the other RGRP. A priority of an RGRP may be based on service plans of the subscribers having subscriber sessions grouped within the RGRP.

As shown by reference number 110, the control plane network device may transmit, and the backup user plane network device may receive, an indication of a switchover for the SGRP. The switchover may indicate that the SGRP is to undergo restoration on the backup user plane network device. For example, the switchover may be prompted by a failure of the active user plane network device.

As shown by reference number 120, the backup user plane network device may transition each RGRP to a state associated with traffic forwarding. For example, the state associated with traffic forwarding may be the warm forwarding state. The warm forwarding state may be associated with traffic forwarding in that an RGRP in the warm forwarding state may have traffic that is forwarded by the backup user plane network device. For example, the backup user plane network device may provide basic traffic flow and/or forwarding (e.g., basic Internet services) without traffic services, such as firewall filters, class-of-service, or the like.

The backup user plane network device may transition each RGRP to the warm forwarding state in response to receiving the indication of the switchover. The backup user plane network device may transition each RGRP to the warm forwarding state quickly and one-by-one. In some examples, the backup user plane network device may also transition the SGRP to an active state in response to receiving the indication of the switchover.

As shown by reference number 130, the backup user plane network device may selectively transition each RGRP from the warm forwarding state to a state associated with traffic services. For example, the state associated with traffic services may be the active state. The state may be associated with traffic services in that an RGRP in the active state may have traffic that is forwarded in accordance with the traffic services (e.g., the traffic may be forwarded based on firewall filters, class-of-service, or the like). The backup user plane network device may selectively transition each RGRP from the warm forwarding state to the active state in that the backup user plane network device may transition or refrain from transitioning each RGRP to the active state. For example, the backup user plane network device may iteratively determine whether to transition the RGRPs to the active state. Transitioning an RGRP from the warm forwarding state to the active state may involve installing a full forwarding state of the subscriber sessions represented by the RGRP in hardware of the backup user plane network device.

In some aspects, the backup user plane network device may monitor resources of the backup user plane network device and selectively transition each RGRP from the warm forwarding state to the active state. The resources may be hardware resources. For example, the backup user plane network device may transition RGRPs one-by-one to the active state until reaching hardware resource limits of the backup user plane network device. As a result, the hardware resource limitations may prevent full restoration of all of the subscriber sessions impacted by the switchover (e.g., some of the subscriber sessions may remain in the warm forwarding state). The hardware resource limits may be reached, for example, in cases where the backup user plane network device is already serving another SGRP due to a failover involving another active user plane network device.

In some aspects, the backup user plane network device may transition a first RGRP to the active state, monitor the resources of the backup user plane network device after a delay after transitioning the first RGRP to the active state, and selectively transition a second RGRP to the active state based on monitoring the resources after the delay. For example, the delay may begin after the first RGRP has transitioned to the active state and may end before the backup user plane network device monitors the resources. Upon expiration of the delay, the backup user plane network device may monitor the resources. For example, the backup user plane network device may verify whether sufficient hardware resources are available to support the second RGRP.

If the hardware resource limit has been reached (e.g., if hardware resources are insufficient to restore the full state of the second RGRP), then the backup user plane network device may stop full state restoration and any remaining subscriber sessions that have not been fully restored may remain in the warm forwarding state. If sufficient hardware resources are available to support the second RGRP (e.g., if a hardware resource limit of the backup user plane network device has not been reached), then the backup user plane network device may proceed to the second RGRP. The backup user plane network device may continue to perform iterative delay-based resource monitoring for each subsequent RGRP until all subscriber session states for the RGRP have been fully restored or the hardware resource limits have been reached.

In some aspects, a size of the RGRPs may be based on a resource utilization of the backup user plane network device. The size of an RGRP (e.g., an RGRP group size) may be a quantity of subscriber sessions that belong to the RGRP. The size of the RGRP may be a subset of the subscriber session scale used for the SGRP. For example, the subset may be 64 subscriber sessions, 100 subscriber sessions, 256 subscriber sessions, or the like. In some examples, the backup user plane network device may perform full-state restoration on a per-RGRP basis in increments of RGRP group size, which may vary. For example, the RGRP group size for each subsequent RGRP may vary (e.g., decrease) programmatically as hardware resource utilization approaches the hardware resource limit. The RGRP group size may vary (e.g., decrease) or remain fixed as hardware resource limits are approached.

In some aspects, the backup user plane network device may selectively transition each RGRP from the warm forwarding state to the active state based on the respective priorities associated with the RGRPs. For example, the backup user plane network device may determine whether to transition each RGRP to the active state in order of priority. For example, the backup user plane network device may restore the RGRPs in a priority order from highest to lowest priority. Additionally, or alternatively, the backup user plane network device may restore the RGRPs based on other criteria, such as time order (e.g., order of subscriber login).

In some aspects, the backup user plane network device may transmit a report indicating one or more states associated with one or more of the RGRPs. For example, the backup user plane network device may transmit the report to the control plane network device. The state(s) may be associated with the RGRP(s) in that the RGRP(s) may be in the state(s). For example, the report may indicate a quantity of RGRPs that are in the warm forwarding state and/or a quantity of RGRPs that are in the active state. In some examples, the report may also identify the RGRP(s) that are in the warm forwarding state and/or the RGRP(s) that are in the active state. The backup user plane network device may transmit the report at any suitable time. In some examples, the backup user plane network device may transmit reports periodically. In some examples, the backup user plane network device may transmit the report in response to a triggering event, such as the hardware resource limits being reached.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
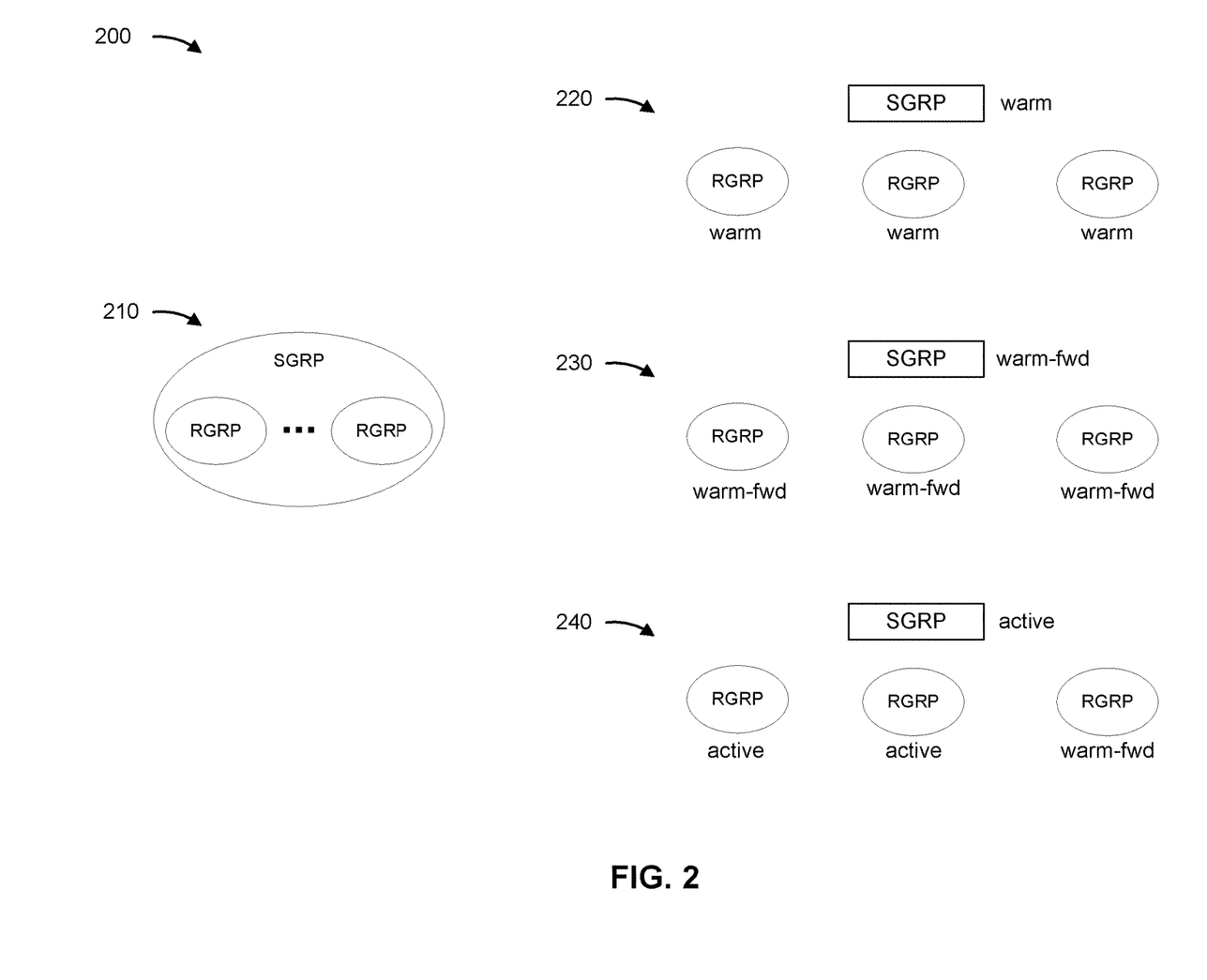
FIG. 2 is a diagram of an example implementation associated with incremental restoration of full subscriber session state for an SGRP using RGRPs.

FIG. 2 is a diagram of an example implementation 200 associated with incremental restoration of full subscriber session state for an SGRP using RGRPs.

As shown by reference number 210, the SGRP may be decomposed into one or more units of RGRPs. Each RGRP may represent a block of subscriber sessions that are to be selectively restored sequentially (e.g., the backup user plane network device may restore a first RGRP before selectively restoring a second RGRP).

Reference numbers 220-240 illustrate a sequence for restoration of the full subscriber session state for the RGRPs. As shown by reference number 220, before the switchover, the SGRP and each of the RGRPs are in the warm standby state. As shown by reference number 230, upon switchover, the backup user plane network device transitions the SGRP, and the RGRPs one-by-one, to the warm forwarding state. As shown by reference number 240, the backup user plane network device transitions the SGRP, and the RGRPs one-by-one, to the active state. Hardware resource limits may result in one or more subscriber sessions maintaining the warm forwarding state. For example, as shown, an RGRP remains in the warm forwarding state due to hardware resource limitations.

As indicated above, FIG. 2 is provided as an example. Other examples may differ from what is described with regard to FIG. 2

Transitioning each RGRP to the warm forwarding state may enable basic traffic forwarding to occur with low latency for all RGRPs impacted by the switchover. Thus, the latency associated with resumption of forwarding services may be reduced. Selectively transitioning each RGRP from the warm forwarding state to the active state may enable the backup user plane network device to incrementally restore the full states of the subscriber sessions belonging to the RGRPs over time.

Selectively transitioning each RGRP from the warm forwarding state to the active state based on monitoring the resources of the backup user plane network device may enable the backup user plane network device to avoid exceeding hardware resource limits. For example, the backup user plane network device may refrain from transitioning RGRPs to the active state upon reaching the hardware resource limits.

Selectively transitioning an RGRP to the active state based on monitoring the resources of the network device after the delay may enable the backup user plane network device to use restoration heuristics to accommodate latency in hardware resource consumption from a resource monitoring perspective. For example, during the delay, the backup user plane network device may install the subscriber state for an RGRP, thereby allowing the resource monitoring to accurately reflect the installed subscriber state.

Selectively transitioning each RGRP based on the respective priorities associated with the RGRPs may enable the backup user plane network device to restore full traffic services to subscriber sessions belonging to higher-priority RGRPs before restoring full traffic services to subscriber sessions belonging to lower-priority RGRPs. As a result, the backup user plane network device may prevent lower-priority RGRPs from occupying hardware resources that would otherwise be occupied by higher-priority RGRPs. For example, the backup user plane network device may help to ensure that the lower-priority RGRPs do not prevent the higher-priority RGRPs from entering the active state.

The size of the RGRPs being based on the resource utilization of the backup user plane network device may enable the size of the RGRPs to vary, thereby enabling subscriber sessions, that would otherwise not be restored if the size of the RGRPs did not vary, to be restored.

Figure 3:
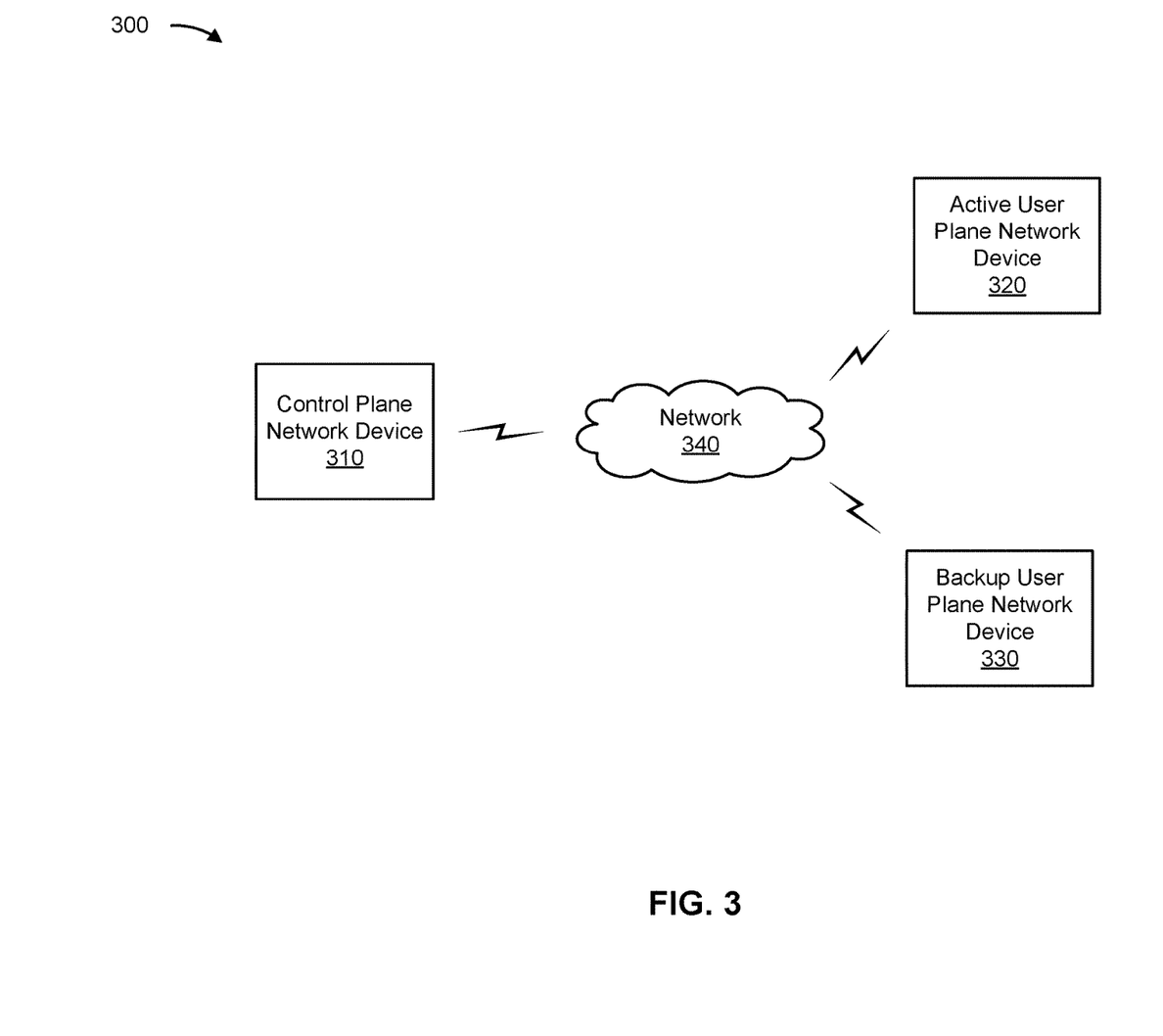
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a control plane network device 310, an active user plane network device 320, a backup user plane network device 330, and a network 340. Devices of environment 300 may interconnect via wired connections, wireless connections, or a combination of wired and wireless connections.

The control plane network device 310 may be a control plane subscriber access device, such as an access gateway function (AGF) control plane (AGF-CP) device or a broadband network gateway (BNG) control plane (BNG-CP) device. The active user plane network device 320 may be an AGF user plane (AGF-UP) device or a BNG user plane (BNG-UP) device. Additionally, or alternatively, the backup user plane network device 330 may be an AGF-UP device or a BNG-UP device. An AGF may be responsible for providing services such as marking, policing, and shaping. A BNG may route traffic to and from broadband remote access devices, such as digital subscriber line access multiplexers (DSLAMs), on an Internet service provider (ISP) network. The BNG may enable subscribers to connect to the broadband network, perform authentication, authorization, and accounting; assign Internet Protocol (IP) addresses; and enforce quality of service (QOS) policies, among other examples.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
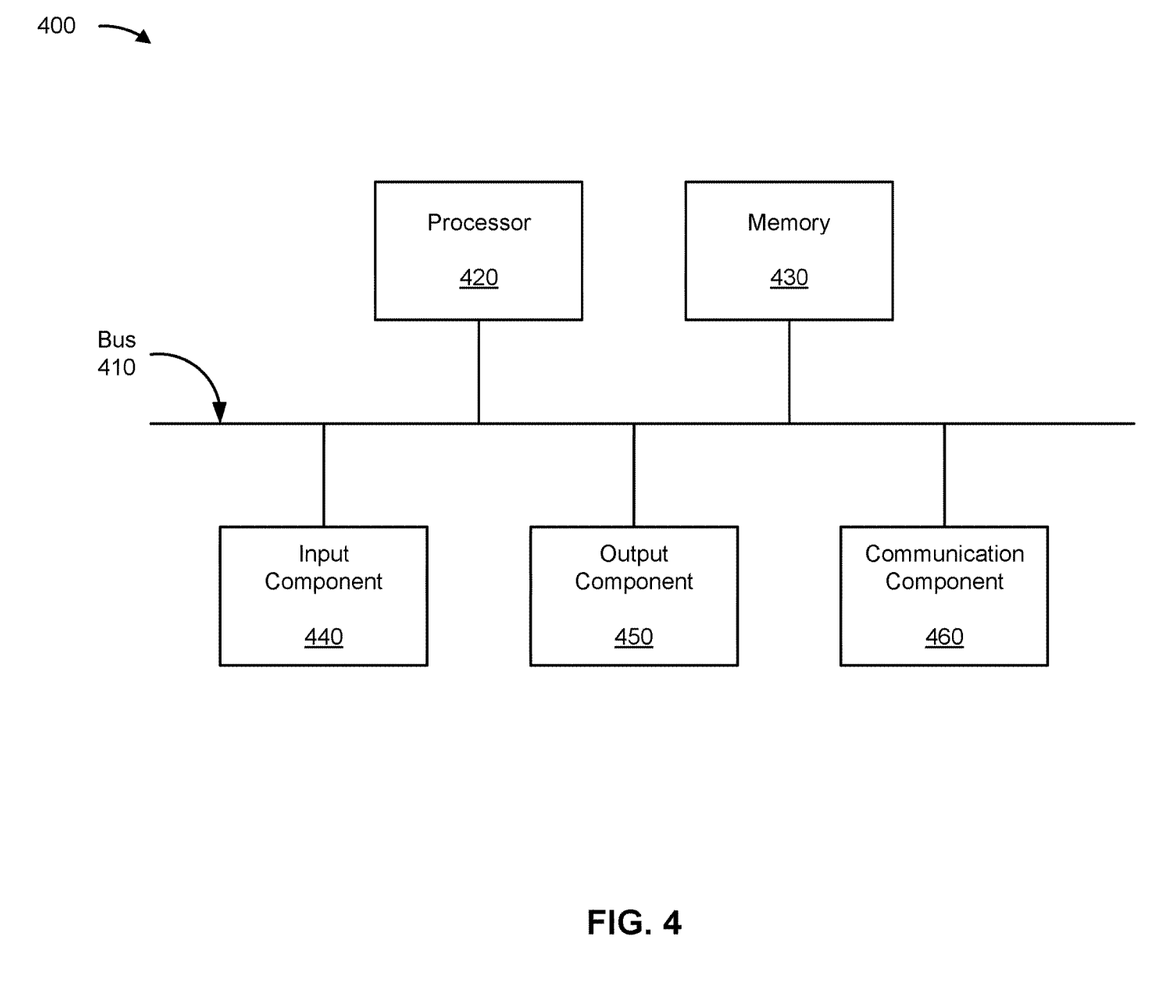
FIG. 4 is a diagram of example components of a device associated with state transitions for RGRPs.

FIG. 4 is a diagram of example components of a device 400 associated with state transitions for RGRPs. The device 400 may correspond to control plane network device 310, active user plane network device 320, and/or backup user plane network device 330. In some implementations, control plane network device 310, active user plane network device 320, and/or backup user plane network device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
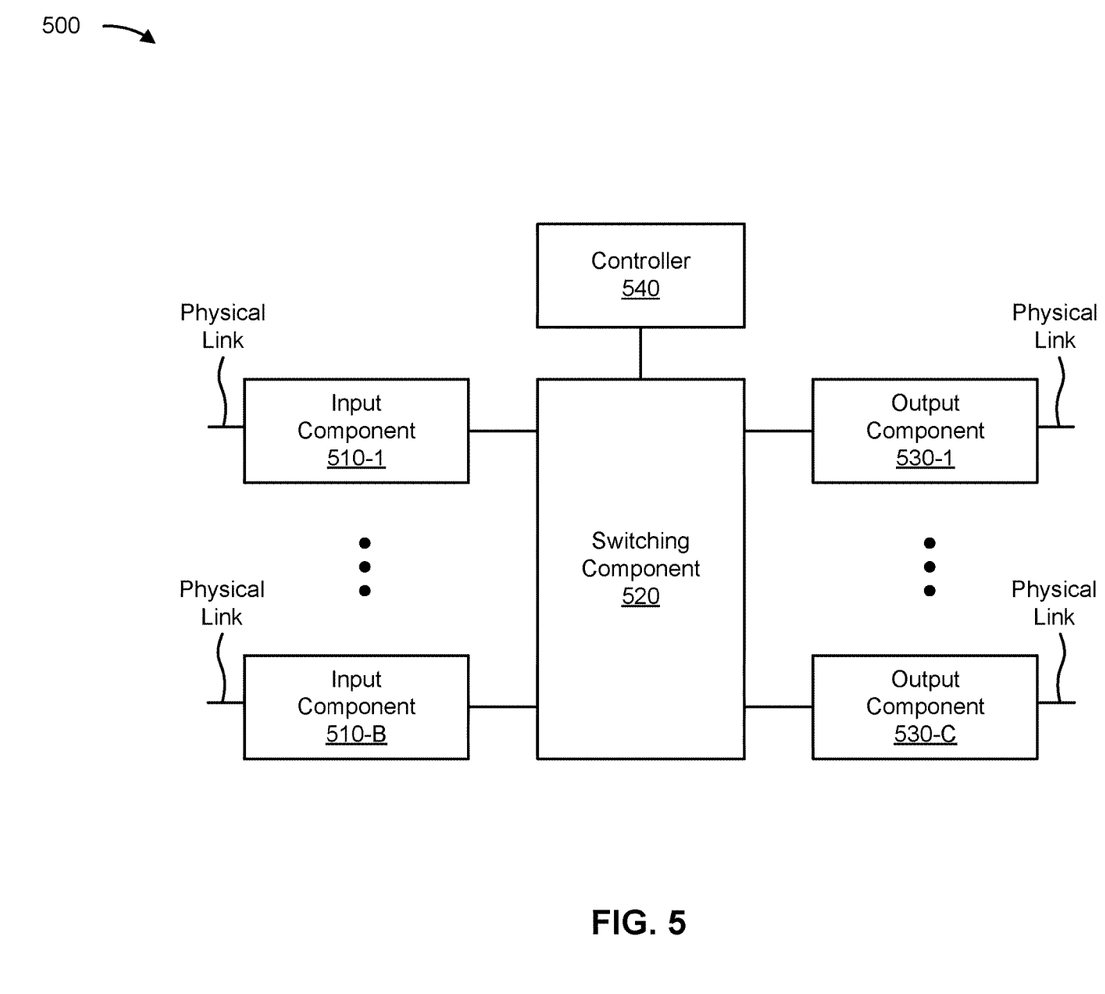
FIG. 5 is a diagram of example components of a device associated with state transitions for RGRPs.

FIG. 5 is a diagram of example components of a device 500 associated with state transitions for RGRPs. Device 500 may correspond to control plane network device 310, active user plane network device 320, and/or backup user plane network device 330. In some implementations, control plane network device 310, active user plane network device 320, and/or backup user plane network device 330 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
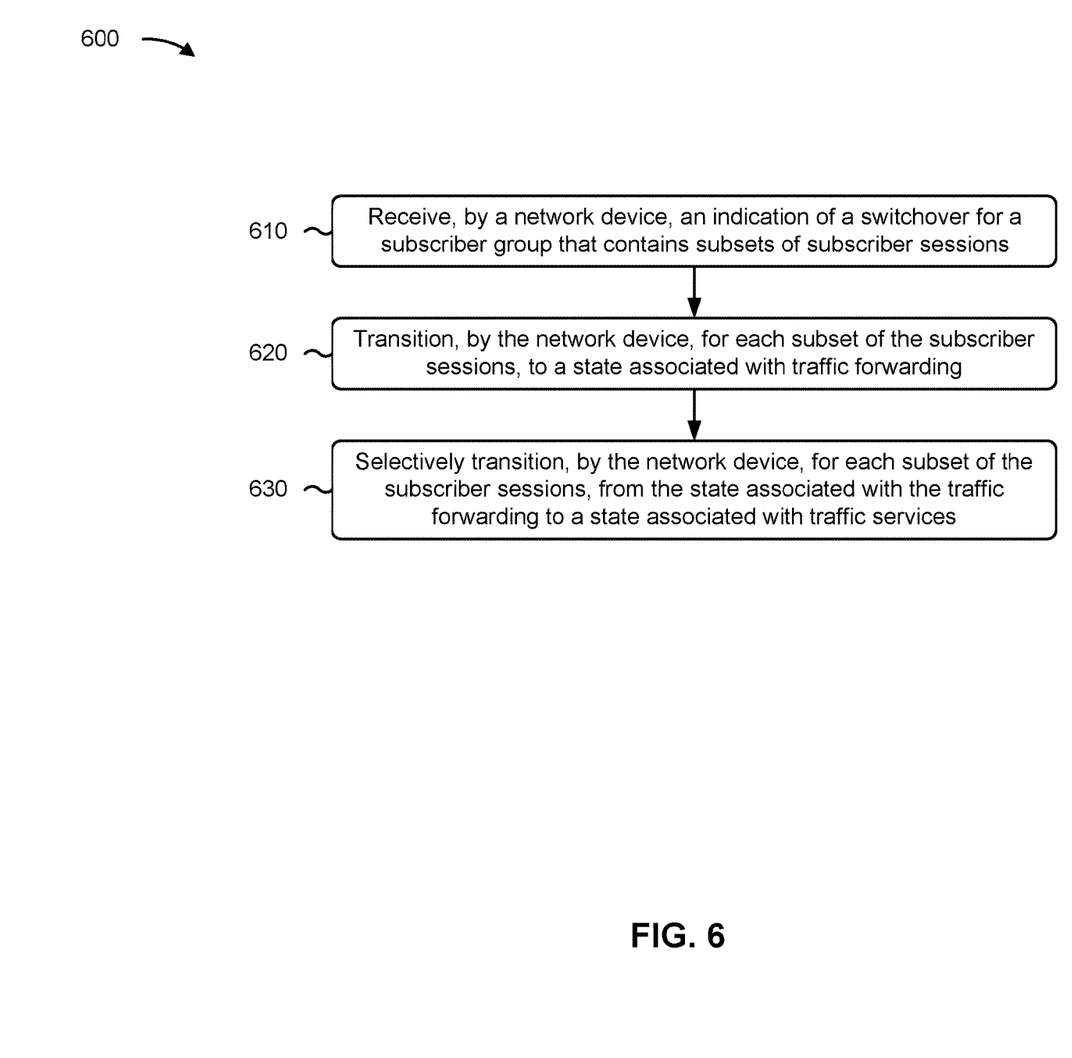
FIG. 6 is a flowchart of an example process associated with state transitions for RGRPs.

FIG. 6 is a flowchart of an example process 600 associated with state transitions for RGRPs. In some implementations, one or more process blocks of FIG. 6 are performed by a network device (e.g., the backup user plane network device shown in FIG. 1). In some implementations, one or more process blocks of FIG. 6 are performed by another device or a group of devices separate from or including the network device, such as a control plane network device (e.g., control plane network device 310), an active user plane network device (e.g., active user plane network device 320 and/or a backup user plane network device (e.g., backup user plane network device 330). Additionally, or alternatively, one or more process blocks of FIG. 6 may be performed by one or more components of device 400, such as processor 420, memory 430, input component 440, output component 450, and/or communication component 460, and/or one or more components of device 500, such as input component 510, switching component 520, output component 530, and/or controller 540.

As shown in FIG. 6, process 600 may include receiving an indication of a switchover for a subscriber group that contains subsets of subscriber sessions (block 610). For example, the network device may receive an indication of a switchover for a subscriber group that contains subsets of subscriber sessions, as described above.

As further shown in FIG. 6, process 600 may include transitioning each subset of the subscriber sessions to a state associated with traffic forwarding (block 620). For example, the network device may transition each subset of the subscriber sessions to a state associated with traffic forwarding, as described above.

As further shown in FIG. 6, process 600 may include selectively transitioning each subset of the subscriber sessions from the state associated with the traffic forwarding to a state associated with traffic services (block 630). For example, the network device may selectively transition each subset of the subscriber sessions from the state associated with the traffic forwarding to a state associated with traffic services, as described above.

Process 600 may include additional implementations, such as any single implementation or any combination of implementations described below and/or in connection with one or more other processes described elsewhere herein.

In a first implementation, process 600 includes monitoring, by the network device, resources of the network device, and selectively transitioning each subset of the subscriber sessions to the state associated with the traffic services includes selectively transitioning each subset of the subscriber sessions to the state associated with the traffic services based on monitoring the resources of the network device.

In a second implementation, alone or in combination with the first implementation, selectively transitioning each subset of the subscriber sessions to the state associated with the traffic services includes transitioning a first subset, of the subsets of the subscriber sessions, to the state associated with the traffic services, monitoring the resources of the network device includes monitoring the resources of the network device after a delay after transitioning the first subset to the state associated with the traffic services, and selectively transitioning each subset of the subscriber sessions to the state associated with the traffic services further includes selectively transitioning a second subset, of the subsets of the subscriber sessions, to the state associated with the traffic services based on monitoring the resources of the network device after the delay.

In a third implementation, alone or in combination with one or more of the first and second implementations, selectively transitioning each subset of the subscriber sessions to the state associated with the traffic services includes selectively transitioning each subset of the subscriber sessions to the state associated with the traffic services based on respective priorities associated with the subsets of the subscriber sessions.

In a fourth implementation, alone or in combination with one or more of the first through third implementations, process 600 includes receiving one or more indications of the respective priorities.

In a fifth implementation, alone or in combination with one or more of the first through fourth implementations, process 600 includes transmitting a report indicating one or more states associated with one or more of the subsets of the subscriber sessions.

In a sixth implementation, alone or in combination with one or more of the first through fifth implementations, a size of the subsets of the subscriber sessions is based on a resource utilization of the network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a network device, an indication of a switchover for a subscriber group that contains subsets of subscriber sessions;
 transitioning, by the network device, each subset of the subscriber sessions to a state associated with traffic forwarding without traffic services; and
 selectively transitioning, by the network device, each subset of the subscriber sessions from the state associated with the traffic forwarding to a state associated with traffic services, wherein the traffic services include at least one or more of traffic forwarding based on a firewall filter or traffic forwarding based on a class-of-service.

2. The method of claim 1, further comprising:
 monitoring, by the network device, resources of the network device,
  wherein selectively transitioning each subset of the subscriber sessions to the state associated with the traffic services includes selectively transitioning each subset of the subscriber sessions to the state associated with the traffic services based on monitoring the resources of the network device.

3. The method of claim 2, wherein selectively transitioning each subset of the subscriber sessions to the state associated with the traffic services includes transitioning a first subset, of the subsets of the subscriber sessions, to the state associated with the traffic services,
 wherein monitoring the resources of the network device includes monitoring the resources of the network device after a delay after transitioning the first subset to the state associated with the traffic services, and
 wherein selectively transitioning each subset of the subscriber sessions to the state associated with the traffic services further includes selectively transitioning a second subset, of the subsets of the subscriber sessions, to the state associated with the traffic services based on monitoring the resources of the network device after the delay.

4. The method of claim 1, wherein selectively transitioning each subset of the subscriber sessions to the state associated with the traffic services includes selectively transitioning each subset of the subscriber sessions to the state associated with the traffic services based on respective priorities associated with the subsets of the subscriber sessions.

5. The method of claim 4, further comprising:
 receiving one or more indications of the respective priorities.

6. The method of claim 1, further comprising:
 transmitting a report indicating one or more states associated with one or more of the subsets of the subscriber sessions.

7. The method of claim 1, wherein a size of the subsets of the subscriber sessions is based on a resource utilization of the network device.

8. A network device, comprising:
 one or more memories; and
 one or more processors to:
  receive an indication of a switchover for a subscriber group that contains redundancy groups of subscriber sessions;
  transition each redundancy group to a state associated with traffic forwarding without traffic services; and
  selectively transition each redundancy group from the state associated with the traffic forwarding to a state associated with traffic services, wherein the traffic services include at least one or more of traffic forwarding based on a firewall filter or traffic forwarding based on a class-of-service.

9. The network device of claim 8, wherein the one or more processors are further to:
 monitor resources of the network device,
  wherein the one or more processors, to selectively transition each redundancy group to the state associated with the traffic services, are to selectively transition each redundancy group to the state associated with the traffic services based on monitoring the resources of the network device.

10. The network device of claim 9, wherein the one or more processors, to selectively transition each redundancy group to the state associated with the traffic services, are to transition a first redundancy group, of the redundancy groups, to the state associated with the traffic services,
 wherein the one or more processors, to monitor the resources of the network device, are to monitor the resources of the network device after a delay after transitioning the first redundancy group to the state associated with the traffic services, and
 wherein the one or more processors, to selectively transition each redundancy group to the state associated with the traffic services, are further to selectively transition a second redundancy group, of the redundancy groups, to the state associated with the traffic services based on monitoring the resources of the network device after the delay.

11. The network device of claim 8, wherein the one or more processors, to selectively transition each redundancy group to the state associated with the traffic services, are to selectively transition each redundancy group to the state associated with the traffic services based on respective priorities associated with the redundancy groups.

12. The network device of claim 11, wherein the one or more processors are further to:
 receive one or more indications of the respective priorities.

13. The network device of claim 8, wherein the one or more processors are further to:
 transmit a report indicating one or more states associated with one or more of the redundancy groups.

14. The network device of claim 8, wherein a size of the redundancy groups is based on a resource utilization of the network device.

15. A non-transitory computer-readable medium storing a set of instructions, the set of instructions comprising:
one or more instructions that, when executed by one or more processors of an oversubscribed network device, cause the oversubscribed network device to:
receive an indication of a switchover for a subscriber group that contains subsets of subscriber sessions;
transition each subset of the subscriber sessions to a state associated with traffic forwarding without traffic services; and
selectively transition each subset of the subscriber sessions from the state associated with the traffic forwarding to a state associated with traffic services, wherein the traffic services include at least one or more of traffic forwarding based on a firewall filter or traffic forwarding based on a class-of-service.

16. The non-transitory computer-readable medium of claim 15, wherein the one or more instructions further cause the oversubscribed network device to:
monitor resources of the oversubscribed network device,
wherein the one or more instructions, that cause the oversubscribed network device to selectively transition each subset of the subscriber sessions to the state associated with the traffic services, cause the oversubscribed network device to selectively transition each subset of the subscriber sessions to the state associated with the traffic services based on monitoring the resources of the oversubscribed network device.

17. The non-transitory computer-readable medium of claim 16, wherein the one or more instructions, that cause the oversubscribed network device to selectively transition each subset of the subscriber sessions to the state associated with the traffic services, cause the oversubscribed network device to transition a first subset, of the subsets of the subscriber sessions, to the state associated with the traffic services,
wherein the one or more instructions, that cause the oversubscribed network device to monitor the resources of the oversubscribed network device, cause the oversubscribed network device to monitor the resources of the oversubscribed network device after a delay after transitioning the first subset to the state associated with the traffic services, and
wherein the one or more instructions, that cause the oversubscribed network device to selectively transition each subset of the subscriber sessions to the state associated with the traffic services, cause the oversubscribed network device to selectively transition a second subset, of the subsets of the subscriber sessions, to the state associated with the traffic services based on monitoring the resources of the oversubscribed network device after the delay.

18. The non-transitory computer-readable medium of claim 15, wherein the one or more instructions, that cause the oversubscribed network device to selectively transition each subset of the subscriber sessions to the state associated with the traffic services, cause the oversubscribed network device to selectively transition each subset of the subscriber sessions to the state associated with the traffic services based on respective priorities associated with the subsets of the subscriber sessions.

19. The non-transitory computer-readable medium of claim 18, wherein the one or more instructions further cause the oversubscribed network device to:
receive one or more indications of the respective priorities.

20. The non-transitory computer-readable medium of claim 15, wherein the one or more instructions further cause the oversubscribed network device to:
transmit a report indicating one or more states associated with one or more of the subsets of the subscriber sessions.

* * * * *